United States Patent
Oikawa et al.

(10) Patent No.: US 10,615,734 B2
(45) Date of Patent: Apr. 7, 2020

(54) PARAMETER DETERMINATION SUPPORTING DEVICE

(71) Applicant: FANUC CORPORATION, Yamanashi (JP)

(72) Inventors: Kouki Oikawa, Yamanashi (JP); Yuuki Morita, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/123,357

(22) Filed: Sep. 6, 2018

(65) Prior Publication Data

US 2019/0097567 A1 Mar. 28, 2019

(30) Foreign Application Priority Data

Sep. 28, 2017 (JP) .................................. 2017-188668

(51) Int. Cl.
  *H02P 29/40* (2016.01)
  *H02P 23/14* (2006.01)
  *G05B 19/408* (2006.01)

(52) U.S. Cl.
  CPC ............ *H02P 29/40* (2016.02); *G05B 19/408* (2013.01); *H02P 23/14* (2013.01); *H02P 2205/01* (2013.01); *H02P 2205/07* (2013.01)

(58) Field of Classification Search
  CPC .......... H02P 21/22; H02P 21/18; H02P 27/08; G01R 31/343; B62D 5/0463
  See application file for complete search history.

(56) References Cited

U.S. PATENT DOCUMENTS 6,066,934 A * 5/2000 Kaitani ................... H02P 23/08
                                                       318/490
6,362,593 B1 * 3/2002 Lee ..................... H02P 23/0077
                                                       318/722

(Continued)

FOREIGN PATENT DOCUMENTS

JP      H08-221132 A     8/1996
JP      2003-316422 A    11/2003

(Continued)

OTHER PUBLICATIONS

An Office Action; "Notice of Reasons for Refusal," mailed by the Japanese Patent Office dated Jun. 25, 2019, which corresponds to Japanese Patent Application No. 2017-188668 and is related to U.S. Appl. No. 16/123,357; with English language translation.

*Primary Examiner* — Shawki S Ismail
*Assistant Examiner* — Zoheb S Imtiaz
(74) *Attorney, Agent, or Firm* — Studebaker & Brackett PC (57) ABSTRACT

To determine a driving parameter for driving a motor having an unknown circuit constant in a simple way and to shorten time required for the determination. A parameter determination supporting device comprises: initial parameter determination means that determines an initial parameter for a trial run based on specification information about a motor driver and output specification information about a motor; program generation means that generates a trial run program based on the output specification information about the motor, the trial run program being used in a trial run for acquiring data necessary for adjusting a parameter for determining an output from the motor; automatic measurement means that automatically measures operation information determined by driving the motor by applying the initial parameter and following the trial run program; estimation means that estimates the circuit constant of the motor based (Continued)

on the operation information; and calculation means that calculates an optimum parameter conforming to the output specification of the motor based on the circuit constant.

7 Claims, 5 Drawing Sheets

(56) References Cited

U.S. PATENT DOCUMENTS

| | | | | |
|---|---|---|---|---|
| 8,198,840 B2* | 6/2012 | Hexamer | ................ | H02P 21/13 |
| | | | | 318/400.01 |
| 9,947,352 B1* | 4/2018 | Sudo | ................... | G11B 5/5547 |
| 10,008,227 B1* | 6/2018 | Sudo | ....................... | G11B 21/02 |
| 2003/0179486 A1* | 9/2003 | Ho | ....................... | G11B 5/5521 |
| | | | | 360/71 |
| 2005/0062450 A1* | 3/2005 | Pace | ....................... | H02P 21/16 |
| | | | | 318/432 |
| 2006/0034009 A1* | 2/2006 | Maiocchi | ............. | G11B 5/5547 |
| | | | | 360/77.02 |
| 2006/0034592 A1* | 2/2006 | Maiocchi | ............. | G11B 5/5547 |
| | | | | 388/833 |
| 2007/0132421 A1* | 6/2007 | Iwashita | .............. | G05B 19/404 |
| | | | | 318/650 |
| 2008/0203959 A1* | 8/2008 | Norihisa | ............ | G05B 19/404 |
| | | | | 318/630 |
| 2013/0026963 A1* | 1/2013 | Sonoda | ................... | H02P 23/14 |
| | | | | 318/561 |
| 2014/0152202 A1* | 6/2014 | Tazawa | ................... | H02P 23/14 |
| | | | | 318/400.01 |
| 2015/0194918 A1* | 7/2015 | Yamashita | ........... | B60L 3/0061 |
| | | | | 318/400.02 |
| 2017/0237375 A1* | 8/2017 | Pramod | .................... | H02P 6/28 |
| | | | | 318/400.02 |
| 2017/0373629 A1* | 12/2017 | Shin | ........................ | H02P 21/22 |
| 2018/0287544 A1* | 10/2018 | Kato | ........................ | H02M 1/32 |

FOREIGN PATENT DOCUMENTS

| | | |
|---|---|---|
| JP | 2006-226993 A | 8/2006 |
| JP | 2007-074816 A | 3/2007 |
| JP | 2008-102714 A | 5/2008 |
| JP | 2010-011638 A | 1/2010 |

* cited by examiner

PARAMETER DETERMINATION SUPPORTING DEVICE

This application is based on and claims the benefit of priority from Japanese Patent Application No. 2017-188668, filed on 28 Sep. 2017, the content of which is incorporated herein by reference.

BACKGROUND OF THE INVENTION

Field of the Invention

The present invention relates to a parameter determination supporting device.

Related Art

For control over a servo motor used in a servo mechanism incorporated in a machine tool, a packaging machine, or an industrial robot, for example, a driving parameter for driving the servo motor should be set at an appropriate value. The driving parameter is set by a method disclosed in Patent Document 1, for example. According to a technique disclosed in Patent Document 1, a parameter for a driving system is acquired, the driving system is operated by following a trial operation program generated according to the acquired parameter, and a parameter for a controller is adjusted based on a result of analysis of operation data acquired during the operation.

Patent Document 1: Japanese Unexamined Patent Application, Publication No. 2003-316422

SUMMARY OF THE INVENTION

Patent Document 1 is based on the assumption that a circuit constant such as the resistance value or the inductance of a motor is a known value. To drive a motor having an unknown circuit constant or a motor in which the accuracy of a value presented as a circuit constant is unknown, an initial parameter for a trial run should be determined based on known information such as the rated output or the base speed of the motor, and an optimum driving parameter should be determined based on data about a current value or a speed measured during the trial run conducted by performing particular operation. However, a complicated procedure is required for determining an optimum driving parameter. Thus, a worker is required to be skilled, and determining an optimum driving parameter is time-consuming.

The present invention is intended to provide a parameter determination supporting device capable of determining a driving parameter in a simple way for driving a motor having an unknown circuit constant, and capable of shortening time required for the determination.

(1) A parameter determination supporting device (parameter determination supporting device 11 described later, for example) for driving a motor according to the present invention comprises: acquisition means (acquisition unit 114 described later, for example) that acquires specification information about a motor driver (motor driver 31 described later, for example) and output specification information about a motor (motor 41 described later, for example); initial parameter determination means (initial parameter determination unit 115 described later, for example) that determines an initial parameter for a trial run based on the specification information and the output specification information; program generation means (program generation unit 116 described later, for example) that generates a trial run program based on the output specification information, the trial run program being used in a trial run for acquiring data necessary for adjusting a parameter for determining an output from the motor; automatic measurement means (automatic measurement unit 117 described later, for example) that automatically measures operation information determined by driving the motor by applying the initial parameter and following the trial run program; estimation means (estimation unit 118 described later, for example) that estimates the circuit constant of the motor based on the operation information; and calculation means (calculation unit 119 described later, for example) that calculates an optimum parameter conforming to the output specification of the motor based on the circuit constant.

(2) The parameter determination supporting device (parameter determination supporting device 11 described later, for example) described in (1) may further comprise: detection means (detection unit 112 described later, for example) that detects the specification information; and input means (input unit 113 described later, for example) for input of the output specification information by an operator. The acquisition means (acquisition unit 114 described later, for example) may acquire the specification information from the detection means, and acquire the output specification information from the input means.

(3) In the parameter determination supporting device (parameter determination supporting device 11 described later, for example) described in (1) or (2), the specification information may include at least one of the allowable current value of the motor driver (motor driver 31 described later, for example) and a frequency available for driving the motor driver.

(4) In the parameter determination supporting device (parameter determination supporting device 11 described later, for example) described in (1) to (3), the output specification information may include at least one of the rated output and the base speed of the motor (motor 41 described later, for example).

(5) In the parameter determination supporting device (parameter determination supporting device 11 described later, for example) described in (1) to (4), the circuit constant may include at least one of the resistance value and the inductance of the motor (motor 41 described later, for example).

(6) In the parameter determination supporting device (parameter determination supporting device 11 described later, for example) described in (1) to (5), the operation information may include at least one of a current value, a voltage value, a motor speed, and a motor acceleration determined by driving the motor (motor 41 described later, for example).

(7) The parameter determination supporting device (parameter determination supporting device 11 described later, for example) described in (1) to (6) may further comprise display means (display unit 120 described later, for example) that displays the measured operation information.

The present invention is capable of determining a driving parameter in a simple way for driving a motor having an unknown circuit constant, and capable of shortening time required for the determination.

DETAILED DESCRIPTION OF THE INVENTION

Figure 1:
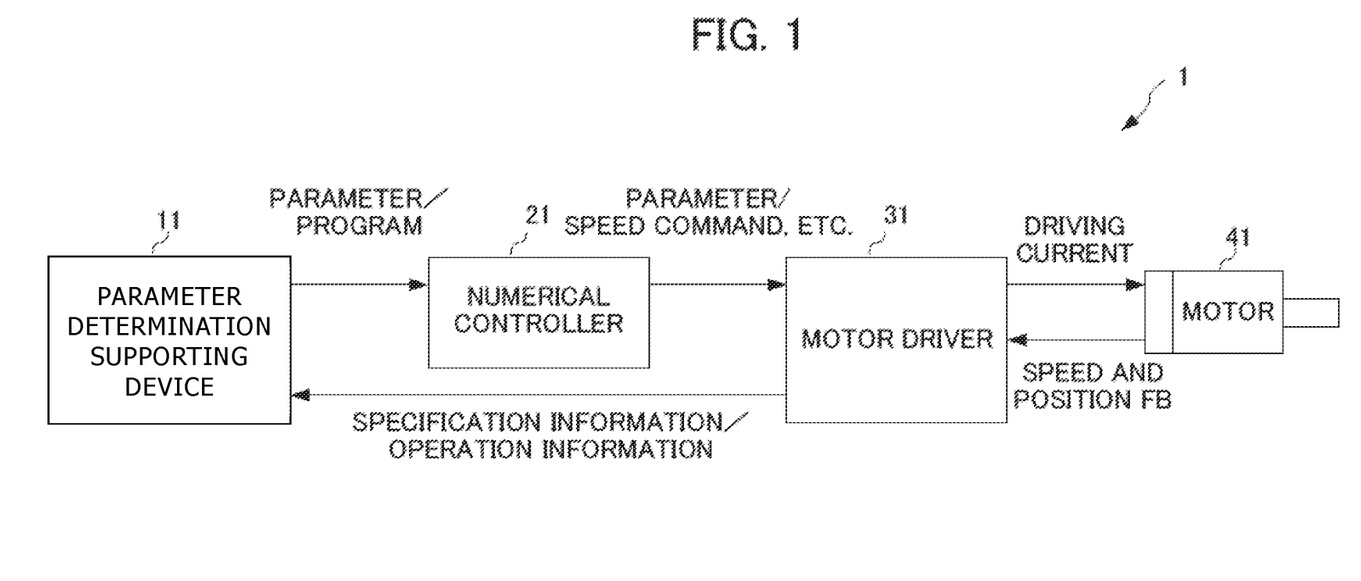
FIG. 1 shows the entire configuration of a motor driving system including a parameter determination supporting device according to an embodiment of the present invention.

An embodiment of the present invention will be described in detail below by referring to FIGS. 1 to 5. FIG. 1 shows the entire configuration of a motor driving system 1 including a parameter determination supporting device according to the embodiment of the present invention. The motor driving system 1 includes a parameter determination supporting device 11, and additionally, a numerical controller 21, a motor driver 31, and a motor 41.

The parameter determination supporting device 11 determines an initial parameter for a trial run of the motor 41 based on specification information about the motor driver 31 received from the motor driver 31 and output specification information about the motor 41 input to the parameter determination supporting device 11 from an operator. Further, the parameter determination supporting device 11 generates a trial run program for the trial run based on the specification information, the output specification information, and the initial parameter. Estimation of the circuit constant of the motor 41 requires a check of data (operation information) such as a driving current value, a driving voltage value, a speed, etc. determined by rotating the motor 41 at a constant speed, or accelerating or decelerating the motor 41. The "trial run" mentioned herein is a trial run of driving the motor 41 for checking these pieces of data. The "driving voltage value" is a voltage required for actually driving the motor 41 at a certain speed and is calculated based on the voltage of a source power supply or a voltage command value. The "initial parameter" mentioned herein includes at least one of a maximum current value for driving the motor 41, a D-phase current value, the maximum speed of the motor 41, and a coefficient for converting a feedback of a current value retrieved from the motor driver 31 to an actual physical quantity, for example. The "specification information" mentioned herein includes at least one of the allowable current value of the motor driver 31 and a frequency available for driving the motor driver 31, for example. The "output specification information" mentioned herein includes at least one of the rated output and the base speed of the motor 41, for example.

The parameter determination supporting device 11 transmits the initial parameter and the trial run program to the numerical controller 21. The numerical controller 21 executes the trial run program by applying the initial parameter to generate command values such as a position command value and a speed command value, and transmits the generated command values and the initial parameter together to the motor driver 31.

The motor driver 31 supplies the motor 41 with a driving current determined based on the initial parameter and the command values received from the numerical controller 21.

The motor 41 transmits feedback values such as speed information, position information, and a speed to the motor driver 31.

The motor driver 31 transmits operation information including the feedback values received from the motor 41, the driving current value, the command values directed to the motor 41, etc. to the parameter determination supporting device 11. The "operation information" mentioned herein includes at least one of a current value, a voltage value, a motor speed, and a motor acceleration, for example, determined by driving the motor 41.

The parameter determination supporting device 11 estimates the circuit constant of the motor 41 based on the operation information received from the motor driver 31. Further, the parameter determination supporting device 11 calculates an optimum parameter conforming to the output specification of the motor 41 based on the circuit constant, and transmits the calculated optimum parameter to the numerical controller 21. The "circuit constant" mentioned herein includes at least one of the resistance value and the inductance of the motor 41, for example.

Figure 2:
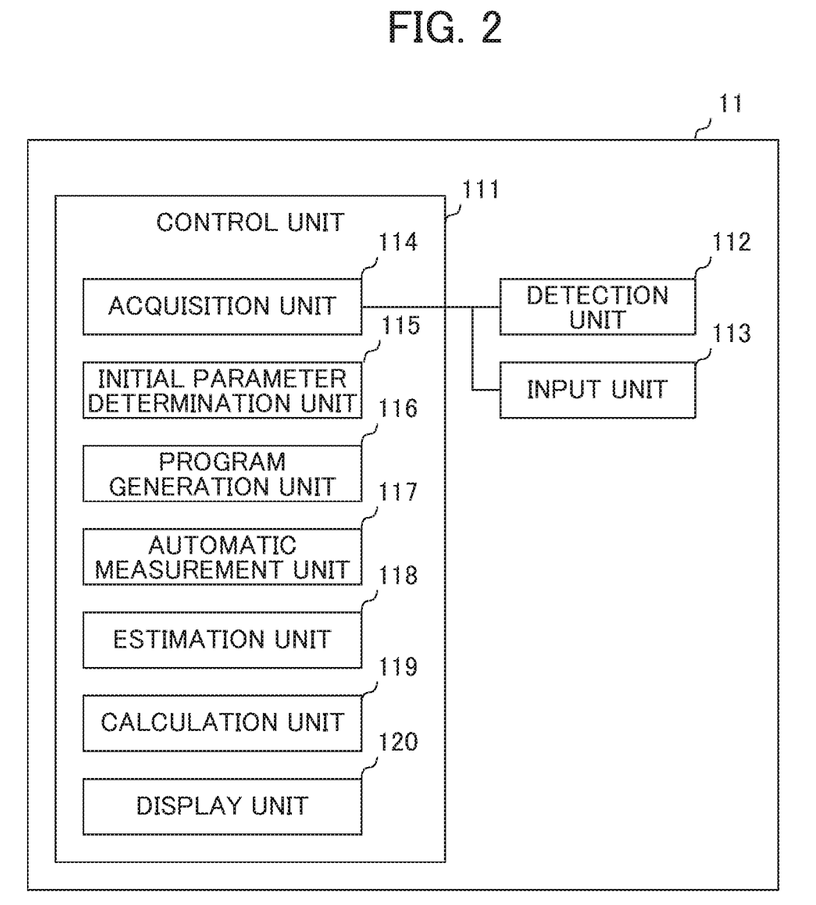
FIG. 2 shows an example of the configuration of the parameter determination supporting device according to the embodiment of the present invention.

FIG. 2 is a functional block diagram of the parameter determination supporting device 11. The parameter determination supporting device 11 includes a control unit 111, a detection unit 112, and an input unit 113. The control unit 111 includes an acquisition unit 114, an initial parameter determination unit 115, a program generation unit 116, an automatic measurement unit 117, an estimation unit 118, a calculation unit 119, and a display unit 120.

The control unit 111 includes a CPU, a ROM, a RAM, a CMOS memory, etc. These are publicly-known parts for a person skilled in the art and are configured to be capable of communicating with each other through a bus. The CPU is a processor that controls the parameter determination supporting device 11 entirely. The CPU is configured in such a manner that the control unit 111 becomes functional as the acquisition unit 114, the initial parameter determination unit 115, the program generation unit 116, the automatic measurement unit 117, the estimation unit 118, the calculation unit 119, and the display unit 120 as shown in FIG. 2 by reading a system program and an application program from the ROM through the bus, and controlling the parameter determination supporting device 11 entirely by following the read system program and application program. The RAM stores various types of data such as temporary calculation data and display data. The CMOS memory is configured as a nonvolatile memory to be backed up by a battery not shown in the drawings and to hold its storage state even after the parameter determination supporting device 11 is powered off.

The acquisition unit 114 acquires specification information about the motor driver 31 and output specification information about the motor 41. In particular, the acquisition unit 114 acquires the specification information about the motor driver 31 from the detection unit 112 described later, and acquires the output specification information about the motor 41 from the input unit 113 described later.

The initial parameter determination unit 115 determines an initial parameter for a trial run based on the specification information and the output specification information acquired by the acquisition unit 114.

The program generation unit 116 generates a trial run program based on the output specification information acquired by the acquisition unit 114. This trial run program is used in a trial run for acquiring data necessary for adjusting a parameter for determining an output from the motor 41.

The automatic measurement unit 117 applies the aforementioned initial parameter and follows the aforementioned trial run program, thereby automatically measuring operation information determined by driving the motor 41.

The estimation unit 118 estimates the circuit constant of the motor 41 based on the operation information measured by the automatic measurement unit 117. Estimation of the circuit constant based on the operation information may be made by a publicly-known method.

The calculation unit 119 calculates an optimum parameter conforming to the output specification of the motor 41 based on the circuit constant estimated by the estimation unit 118.

The display unit 120 displays at least the operation information measured by the automatic measurement unit 117 on a display (not shown in the drawings) of the parameter determination supporting device 11. The display unit 120 may display information other than the operation information. For example, the display unit 120 may display navigation information used as a guide for input of output specification information by an operator using the input unit 113 described later. The navigation information may contain information about a method of operating the parameter determination supporting device 11, for example, in addition to the method of inputting the output specification information. The display unit 120 may further display an estimated value about the aforementioned circuit constant, a parameter used in estimation of the circuit constant, an output waveform determined by using the parameter, and a value about the optimum parameter calculated by the calculation unit 119.

The detection unit 112 is a unit that detects the specification information about the motor driver 31 and is a sensor, for example. The input unit 113 is a unit used by an operator for inputting the output specification information about the motor 41, and is a keyboard or a touch panel, for example.

Figure 3:
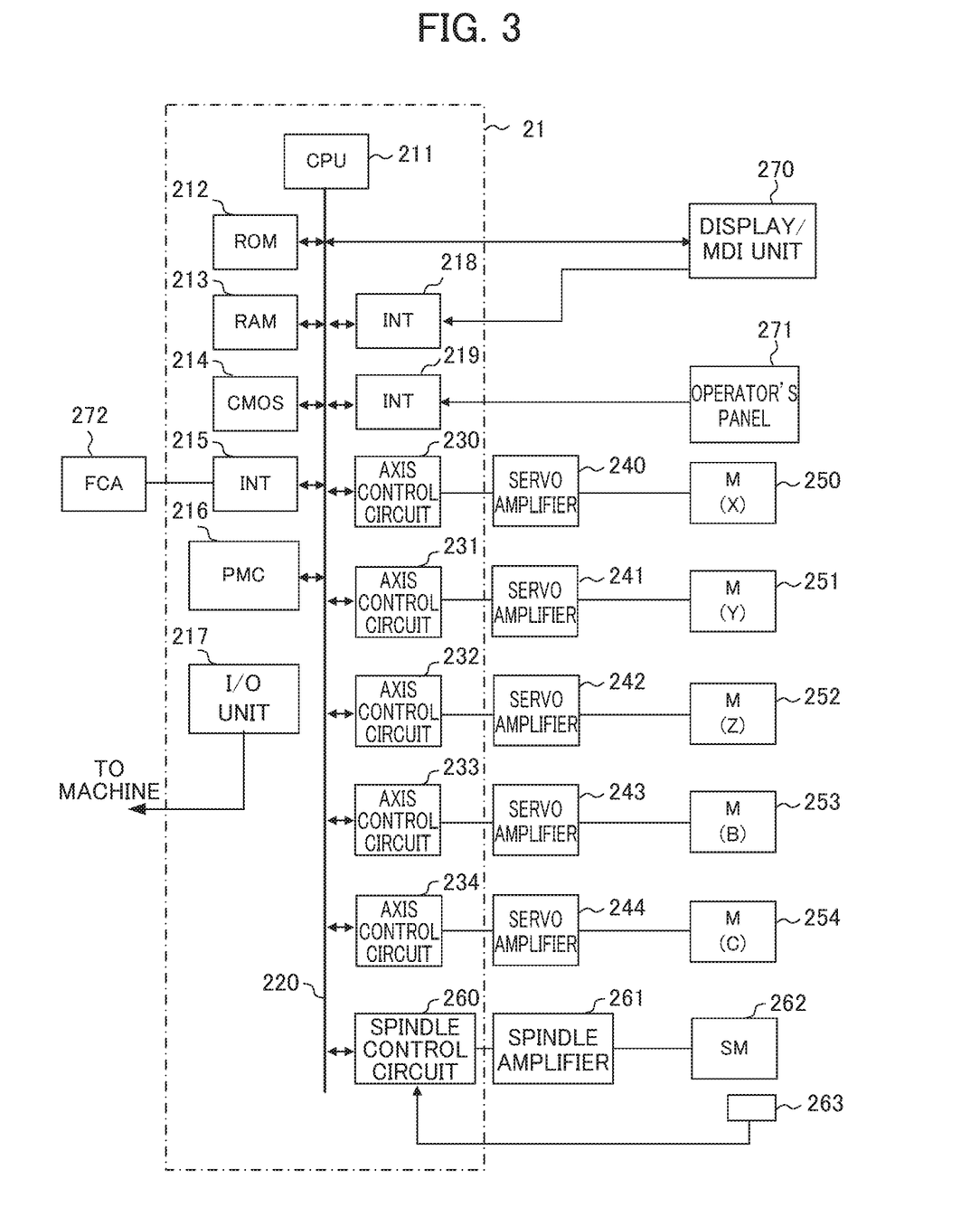
FIG. 3 shows an example of the configuration of a numerical controller according to the embodiment of the present invention.

FIG. 3 shows an example of the configuration of the numerical controller 21. The numerical controller 21 mainly includes a CPU 211, a ROM 212, a RAM 213, a CMOS memory 214, an interface 215, an interface 218, an interface 219, a programmable machine controller (PMC) 216, an I/O unit 217, an axis control circuit 230, an axis control circuit 231, an axis control circuit 232, an axis control circuit 233, an axis control circuit 234, and a spindle control circuit 260.

The CPU 211 is a processor that controls the numerical controller 21 entirely. The CPU 211 reads a system program from the ROM 212 through a bus 220 and controls the numerical controller 21 entirely by following the read system program.

The RAM 213 stores temporary calculated data, display data, and various types of data input by an operator through a display/MDI unit 270.

The CMOS memory 214 is configured as a nonvolatile memory to be backed up by a battery not shown in the drawings and to hold its storage state even after the numerical controller 21 is powered off. The CMOS memory 214 stores a machining program input through the interface 215, a machining program input through the display/MDI unit 270, etc.

The ROM 212 stores various system programs written in advance for executing processing in an edit mode required for generation and editing of a machining program and executing processing for automatic operation.

Various machining programs can be input through the interface 215 or the display/MDI unit 270, and can be stored into the CMOS memory 214.

The interface 215 is to allow connection between the numerical controller 21 and external equipment 272 such as an adapter. A machining program, various parameters, etc., are read from the external equipment 272. A machining program edited in the numerical controller 21 can be stored into external storage means through the external equipment 272.

The programmable machine controller (PMC) 216 outputs a signal through the I/O unit 217 to an auxiliary device (an actuator such as a robot hand for tool change, for example) of a machine tool to control the auxiliary device by following a sequence program provided in the numerical controller 21. The PMC 216 accepts signals input through various switches, etc. of an operator's panel arranged at the body of the machine tool, performs necessary signal processing, and transfers the processed signals to the CPU 211.

The display/MDI unit 270 is a manual data input unit with a display, a keyboard, etc. The interface 218 is used for accepting a command and data from the keyboard of the display/MDI unit 270, and transferring the received command and data to the CPU 211. The interface 219 is connected to an operator's panel 271 including a manual pulse generator, etc.

The axis control circuits 230 to 234 of corresponding axes receive command strokes of the corresponding axes given from the CPU 211, and output the commands on the corresponding axes to a servo amplifier 240, a servo amplifier 241, a servo amplifier 242, a servo amplifier 243, and a servo amplifier 244 respectively. In response to receipt of these commands, the servo amplifiers 240 to 244 drive a servo motor 250, a servo motor 251, a servo motor 252, a servo motor 253, and a servo motor 254 of the corresponding axes respectively. The servo motors 250 to 254 of the corresponding axes each include a built-in position and speed detector. The servo motors 250 to 254 transmit position and speed feedback signals from their position and speed detectors as feedbacks to the axis control circuits 230 to 234 respectively, thereby executing position and speed feedback control. The illustration of the position and speed feedback is omitted from FIG. 3.

The spindle control circuit 260 outputs a spindle speed signal to a spindle amplifier 261 in response to receipt of a spindle rotation command directed to the machine tool. In response to receipt of the spindle speed signal, the spindle amplifier 261 rotates a spindle motor 262 of the machine tool at a rotation speed designated in the command, thereby driving a tool. A pulse encoder 263 is coupled to the spindle motor 262 with a gear or a belt, for example. The pulse encoder 263 outputs a feedback pulse in synchronization with the rotation of a spindle. The feedback pulse passes through the bus 220 to be read by the CPU 211.

The servo amplifiers 240 to 244 and the spindle amplifier 261 correspond to the motor driver 31 in FIG. 1. The servo motors 250 to 254 and the spindle motor 262 correspond to the motor 41 in FIG. 1. The configuration of the numerical controller 21 shown in FIG. 3 is not a limited configuration but is shown merely as an example. A general-purpose numerical controller is usable as the numerical controller 21.

Figure 4:
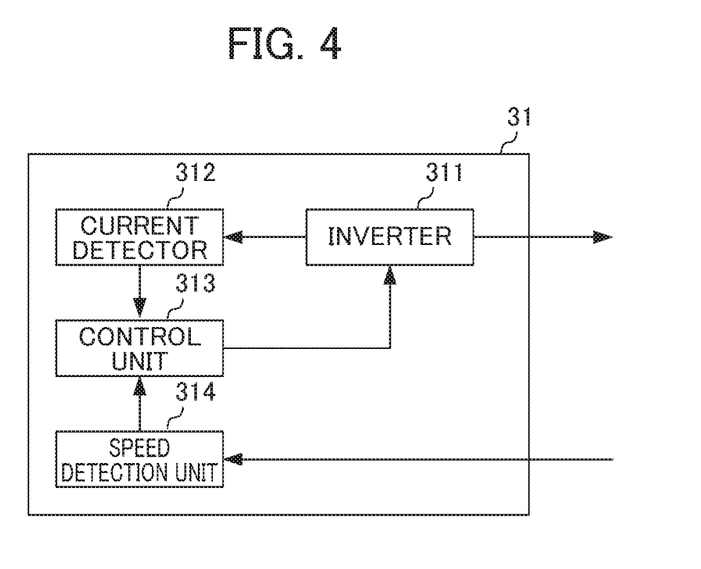
FIG. 4 shows an example of the configuration of a motor driver according to the embodiment of the present invention.

FIG. 4 shows an example of the configuration of the motor driver 31. The motor driver 31 includes an inverter 311, a current detector 312, a control unit 313, and a speed detection unit 314.

The inverter 311 supplies the motor 41 with a driving current. The current detector 312 detects a DC bus current in the inverter 311. The control unit 313 receives an output from the current detector 312, and executes PWM control of the inverter 311. The speed detection unit 314 detects a speed for feedback control of the motor 41, and transmits the detected speed to the control unit 313.

The configuration of the motor driver 31 shown in FIG. 4 is not a limited configuration but is shown merely as an example. A general-purpose motor driver is usable as the motor driver 31.

Figure 5:
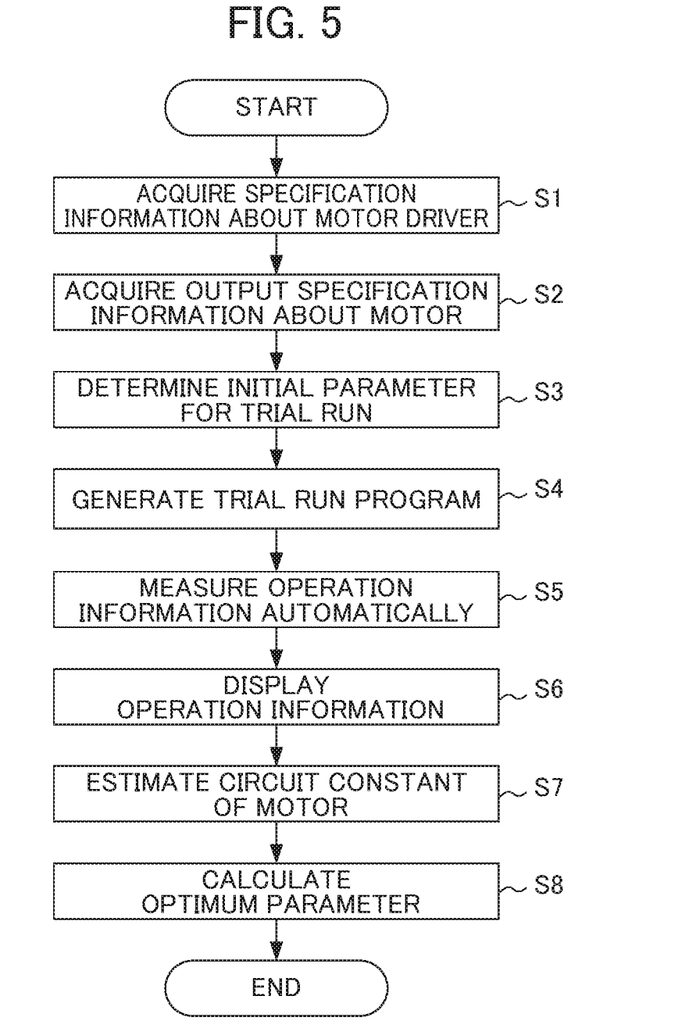
FIG. 5 is a flowchart explaining the operation of the parameter determination supporting device according to the embodiment of the present invention.

FIG. 5 is a flowchart explaining the operation of the parameter determination supporting device 11. In step S1, the detection unit 112 detects specification information about the motor driver 31, and the acquisition unit 114 acquires the specification information from the detection unit 112.

In step S2, an operator inputs output specification information about the motor 41 through the input unit 113, and the acquisition unit 114 acquires the output specification information from the input unit 113.

In step S3, the initial parameter determination unit 115 determines an initial parameter for a trial run based on the specification information and the output specification information acquired by the acquisition unit 114.

In step S4, the program generation unit 116 generates a trial run program based on the output specification information acquired by the acquisition unit 114. This trial run program is used in a trial run for acquiring data necessary for estimating the circuit constant of the motor 41 and adjusting a parameter for determining an output from the motor 41.

In step S5, the automatic measurement unit 117 measures operation information automatically such as a current value or a speed determined by driving the motor 41 controlled by following the trial run program.

In step S6, the display unit 120 displays the operation information measured automatically by the automatic measurement unit 117 on the display (not shown in the drawings). This allows the operator to determine whether a parameter to be determined in step S8 described below is appropriate by directly checking the measured data.

In step S7, the estimation unit 118 estimates the circuit constant of the motor 41 through automatic calculation based on the operation information measured automatically by the automatic measurement unit 117.

In step S8, the calculation unit 119 calculates and determines an optimum parameter conforming to the output specification of the motor 41 based on the circuit constant estimated by the estimation unit 118. Then, the operation flow of the parameter determination supporting device 11 is finished.

Referring to the flowchart illustrated in FIG. 5, after the process in step S8 is performed, the flow may return to a previous step and then the process in this step and those in subsequent steps may be performed again. For example, the parameter determination supporting device 11 may determine one of multiple parameters in step S8. Then, the process in step S4 and those in subsequent steps may be performed again to determine a different parameter.

The parameter determination supporting device 11 applies an initial parameter and follows a trial run program, thereby automatically measuring operation information determined by driving the motor 41. The parameter determination supporting device 11 estimates the circuit constant of the motor 41 based on the measured operation information, and calculates an optimum parameter conforming to the output specification of the motor 41 based on the estimated circuit constant.

By doing so, a driving parameter for driving a motor having an unknown circuit constant is determined in a simple way, and time required for the determination can be shortened.

The aforementioned parameter determination supporting device 11 further includes the display unit 120 that displays measured operation information.

Thus, an operator checks a logic used for determining a parameter and an output resulting from the parameter. By doing so, the operator is allowed to determine an optimum parameter after determining the appropriateness of the parameter.

Each unit in the aforementioned parameter determination supporting device 11 can be realized by hardware, by software, or by a combination of hardware and software. A method of determining a parameter implemented by each unit in the aforementioned parameter determination supporting device 11 can also be realized by hardware, by software, or by a combination of hardware and software. Being realized by software means being realized by the reading and execution of a program by a computer.

The program can be stored using various types of non-transitory computer-readable media and can be supplied to a computer. The non-transitory computer-readable media include various types of tangible storage media. Examples of the non-transitory computer-readable media include a magnetic recording medium (a flexible disk, magnetic tape, or a hard disk drive, for example), a magneto-optical recording medium (a magneto-optical disk, for example), a CD read-only memory (CD-ROM), a CD-R, a CD-R/W, and a semiconductor memory (a mask ROM, a programmable ROM (PROM), an erasable PROM (EPROM), a flash ROM, or a random access memory (RAM), for example). The program may be supplied to a computer using various types of transitory computer-readable media. Examples of the transitory computer-readable media include an electrical signal, an optical signal, and an electromagnetic wave. The transitory computer-readable media can be used for supplying the program to a computer through wired communication paths such as a power cable and an optical fiber, or a wireless communication path.

EXPLANATION OF REFERENCE NUMERALS

1 Motor driving system
11 Parameter determination supporting device
19
21 Numerical controller
31 Motor driver
41 Motor
111 Control unit
112 Detection unit
113 Input unit
114 Acquisition unit
115 Initial parameter determination unit
116 Program generation unit
117 Automatic measurement unit
118 Estimation unit
119 Calculation unit
120 Display unit

What is claimed is:

1. A parameter determination supporting device for driving a motor comprising:
   a processor configured to:
   acquire specification information about a motor driver and output specification information about a motor;
   determine an initial parameter for a trial run based on the specification information and the output specification information;
   generate a trial run program based on the output specification information, the trial run program being used in a trial run for acquiring data necessary for adjusting a parameter for determining an output from the motor;

automatically measure operation information determined by driving the motor by applying the initial parameter and following the trial run program;

estimate a circuit constant of the motor based on the operation information; and calculate an optimum parameter conforming to the output specification of the motor based on the circuit constant.

2. The parameter determination supporting device according to claim 1, wherein the processor is further configured to:

acquire the specification information, and acquire the output specification information input by an operator.

3. The parameter determination supporting device according to claim 1, wherein the specification information includes at least one of an allowable current value of the motor driver and a frequency available for driving the motor driver.

4. The parameter determination supporting device according to claim 1, wherein the output specification information includes at least one of a rated output and a base speed of the motor.

5. The parameter determination supporting device according to claim 1, wherein the circuit constant includes at least one of a resistance value and an inductance of the motor.

6. The parameter determination supporting device according to claim 1, wherein the operation information includes at least one of a current value, a voltage value, a motor speed, and a motor acceleration determined by driving the motor.

7. The parameter determination supporting device according to claim 1, wherein the processor is further configured to display the measured operation information.

* * * * *